United States Patent
Bailey et al.

(10) Patent No.: US 7,077,456 B2
(45) Date of Patent: Jul. 18, 2006

(54) AUTOMOTIVE INTERIOR TRIM ASSEMBLY AND PAD INSERTION

(75) Inventors: Charles D. Bailey, Shelby Township, MI (US); Mark Heinze, Clarkston, MI (US); John Youngs, Southgate, MI (US); Tom Kopcha, Orion, MI (US)

(73) Assignee: Lear Corporation, Southfield, MI (US)

( * ) Notice: Subject to any disclaimer, the term of this patent is extended or adjusted under 35 U.S.C. 154(b) by 111 days.

(21) Appl. No.: 10/708,561

(22) Filed: Mar. 11, 2004

(65) Prior Publication Data

US 2005/0200148 A1   Sep. 15, 2005

(51) Int. Cl.
*B60J 9/00*   (2006.01)
(52) U.S. Cl. .................. 296/153; 297/411.21
(58) Field of Classification Search ........... 296/153, 296/1.09, 37.8; 297/411.45, 411.46, 411.21
See application file for complete search history.

(56) References Cited

U.S. PATENT DOCUMENTS

| | | | |
|---|---|---|---|
| 4,552,328 A | 11/1985 | Dutt et al. ................. 249/67 |
| 4,596,416 A | 6/1986 | Muller | |
| 4,725,089 A | 2/1988 | Langer | |
| 4,902,061 A | 2/1990 | Plavetich et al. | |
| 4,919,470 A | 4/1990 | Muller ..................... 296/153 |
| 4,925,072 A | 5/1990 | Masler et al. | |
| 5,018,800 A | 5/1991 | Cziptschirsch et al. .. 312/344.1 |
| 5,050,922 A | 9/1991 | Falcoff | |
| 5,144,963 A | 9/1992 | Dabringhaus et al. ...... 131/231 |
| 5,199,449 A | 4/1993 | Dabringhaus et al. ...... 131/231 |
| 5,387,390 A | 2/1995 | Kornylo ................... 264/46.8 |
| 5,445,430 A | 8/1995 | Nichols .................... 296/153 |
| 5,489,039 A | 2/1996 | Brownlie et al. | |
| 5,520,313 A | 5/1996 | Toshihide | |
| 5,533,772 A | 7/1996 | Volkers et al. ............ 296/37.9 |
| 5,603,540 A | 2/1997 | Shibao | |
| 5,626,382 A | 5/1997 | Johnson et al. .......... 296/146.7 |
| 5,647,713 A | 7/1997 | Ge et al. .................... 411/509 |
| 5,671,096 A | 9/1997 | Yoshida et al. | |
| 5,692,711 A | 12/1997 | Tucker ....................... 248/118 |

(Continued)

FOREIGN PATENT DOCUMENTS

DE   4141297   6/1993

(Continued)

OTHER PUBLICATIONS

Examiner Monty Siddique, *Combined Search and Examination Report under Sections 17 and 18(3)*, The UK Patent Office.

(Continued)

*Primary Examiner*—Joseph D. Pape
(74) *Attorney, Agent, or Firm*—Wood, Herron & Evans, L.L.P.

(57) ABSTRACT

A trim assembly comprises a substrate member including a moveable panel integrally formed in the substrate and moveable between an open and closed position. A flexible skin overlies at least a portion of the substrate member and is integrally coupled to the substrate. The substrate and flexible skin are configured to define a cavity having an opening. The cavity opening is accessible when the moveable panel is in the open position. A resilient foam pad is positioned within the cavity to provide a soft feel to the trim assembly. The foam pad is inserted into the cavity using a tool that pulls a vacuum and compresses the foam pad. The foam pad is inserted into the cavity and the vacuum is released thereby expanding the foam pad to fill the cavity. The tool is removed and the moveable panel is moved to and secured in the closed position.

7 Claims, 2 Drawing Sheets

U.S. PATENT DOCUMENTS

| | | | |
|---|---|---|---|
| 5,803,415 A | 9/1998 | Konishi et al. | 248/18 |
| 5,893,601 A | 4/1999 | Carlberg | |
| 5,902,006 A | 5/1999 | Janker et al. | 296/153 |
| 5,906,409 A | 5/1999 | DeRees et al. | 296/146.7 |
| 5,951,094 A * | 9/1999 | Konishi et al. | 296/153 |
| 6,013,210 A | 1/2000 | Gardner, Jr. | 264/40.1 |
| 6,017,617 A | 1/2000 | Gardner, Jr. | 428/309.9 |
| 6,085,953 A | 7/2000 | Bober et al. | |
| 6,092,858 A | 7/2000 | Bolwell | 296/146.7 |
| 6,106,261 A | 8/2000 | von Holdt | 425/130 |
| 6,116,672 A | 9/2000 | Cannon et al. | |
| 6,125,030 A | 9/2000 | Mola et al. | |
| 6,213,538 B1 | 4/2001 | Scheidmantel et al. | 296/153 |
| 6,248,200 B1 | 6/2001 | Dailey et al. | 156/245 |
| 6,248,205 B1 | 6/2001 | Scheidmantel et al. | 156/309.6 |
| 6,296,796 B1 | 10/2001 | Gordon | 264/255 |
| 6,391,232 B1 | 5/2002 | Fritsch | 264/46.6 |
| 6,470,627 B1 | 10/2002 | Fukuo | |
| 6,544,449 B1 | 4/2003 | Gardner | 264/46.5 |
| 6,562,275 B1 | 5/2003 | Martinez | 264/308 |
| 6,575,528 B1 | 6/2003 | Tiesler et al. | |
| 6,583,359 B1 | 6/2003 | Cabello-Colon | |
| 6,629,716 B1 | 10/2003 | Shibata et al. | |
| 6,637,795 B1 | 10/2003 | Jonardi et al. | |
| 6,669,258 B1 | 12/2003 | Kato | |
| 6,695,691 B1 | 2/2004 | Le | |
| 6,702,354 B1 | 3/2004 | Galijasevic | 296/37.1 |
| 6,742,823 B1 | 8/2004 | Guanzon et al. | |
| 6,820,921 B1 | 11/2004 | Uleski | |
| 6,874,667 B1 | 4/2005 | Dykstra et al. | |
| 6,883,680 B1 | 4/2005 | Hirose | |
| 6,899,363 B1 | 5/2005 | Dry | |
| 6,918,502 B1 | 7/2005 | Overholt et al. | |
| 6,926,332 B1 | 8/2005 | Youngs et al. | |
| 6,971,698 B1 | 12/2005 | King | |
| 2002/0043861 A1 | 4/2002 | Meadows | 297/411.21 |
| 2002/0066972 A1 | 6/2002 | Fritsch | 264/46.4 |
| 2003/0075944 A1 | 4/2003 | Galijasevic | |
| 2003/0080131 A1 | 5/2003 | Fukuo | |
| 2003/0206985 A1 | 11/2003 | Gedritis et al. | |
| 2004/0216753 A1 | 11/2004 | Fox | |

FOREIGN PATENT DOCUMENTS

| | | |
|---|---|---|
| FR | 2589111 | 4/1987 |
| JP | 11268574 | 10/1999 |
| WO | 2005/068154 | 7/2005 |

OTHER PUBLICATIONS

McAndrew et al., *Control Panel For a Vehicle*, U.S. Patent Application No. 2001/0052715.

D. Glenn Dayoan, *Office Action*, dated as Mailed on Mar. 7, 2006.

* cited by examiner

AUTOMOTIVE INTERIOR TRIM ASSEMBLY AND PAD INSERTION

CROSS-REFERENCE

The present invention is related to U.S. Ser. No. 10/709,698, filed May 24, 2004, U.S. Ser. No. 10/710,497, filed Jul. 15, 2004 and U.S. Ser. No. 10/710,499, filed Jul. 15, 2004.

FIELD OF THE INVENTION

The present invention pertains generally to automotive interiors and more particularly to trim assemblies for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. For example, armrests are typically secured to a vertical panel of the automotive interior such as a door panel and project inboard from the door trim panel to provide a convenient rest for an occupant's arm. To further increase the aesthetic appearance of the trim assemblies and to improve the comfort and convenience to vehicle occupants, it is often desired to form at least portions of the trim assemblies with areas which are soft to the touch. Typically, these soft areas have been formed by providing a resilient padding material beneath a pliable surface layer such as leather, vinyl, or fabric material.

One conventional method of forming a trim assembly with padded material includes injecting a foam material between a rigid substrate and a skin layer joined to the substrate. In another conventional method, a preformed, soft, resilient pad is secured to a rigid plastic shell and a pliable skin layer is stretched over the pad and secured to the shell to form the trim assembly. These prior methods are generally costly due to the multiple components and manufacturing steps required to make the padded trim assemblies.

Various other trim assemblies have been manufactured using a two-shot molding process wherein a relatively soft skin layer is formed over a hard substrate material without padding. The substrate and skin layer are formed so as to provide a recess or cavity for inserting a resilient padding material that provides a soft feel to the trim assembly. To insert the padding material into the recess, the padding material is secured to a top surface of a rigid pad carrier which facilitates the insertion of the pad material into the cavity. A separate closeout or door panel then couples to the substrate to cover the opening to the cavity and enclose the pad carrier and pad material within the cavity. Inserting the pad material into trim assemblies and securing the pad material and pad carrier therein requires additional components that increase the overall manufacturing cost of the trim assemblies.

There is thus a need for an improved trim assembly and a method for inserting foam padding into a trim assembly that reduces the number of components and further reduces manufacturing costs.

SUMMARY OF INVENTION

The present invention provides an automotive interior trim assembly that exhibits a soft feel, but which can be produced in an efficient and cost-effective manner. The trim assembly may be formed as an instrument panel, an armrest, a door panel, a console or other interior trim component that would benefit from having at least some areas which are soft to the touch.

In one embodiment, the trim assembly comprises a substrate member forming at least part of a structural support of the trim assembly and including a moveable panel integrally formed in the substrate and moveable between an open and closed position. A flexible skin overlies at least a portion of the substrate member and is integrally coupled to the substrate. The substrate and flexible skin are configured to define a cavity having an opening. The cavity opening is accessible when the moveable panel is in the open position and the moveable panel covers the cavity opening when in the closed position. A resilient foam pad is positioned within the cavity to provide a soft feel to the trim assembly. The foam pad is insertable into the cavity when the moveable panel is in the open position. The resilient foam pad is enclosed within the cavity when the moveable panel is in the closed position.

The foam pad is inserted into the cavity using a vacuum insertion tool having apertures along a top surface of a planar member adapted to support the foam pad. The foam pad is placed on the top surface of the planar member and a vacuum is created along the apertures that causes the foam pad to compress in a downward direction. The foam pad is then inserted into the cavity while in the compressed state. Once positioned in the cavity, the vacuum is released which causes the foam pad to expand thereby snugly filling the cavity. The vacuum insertion tool is then removed from the cavity and the moveable panel is positioned and secured in the closed position so as to enclose the foam pad within the cavity.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
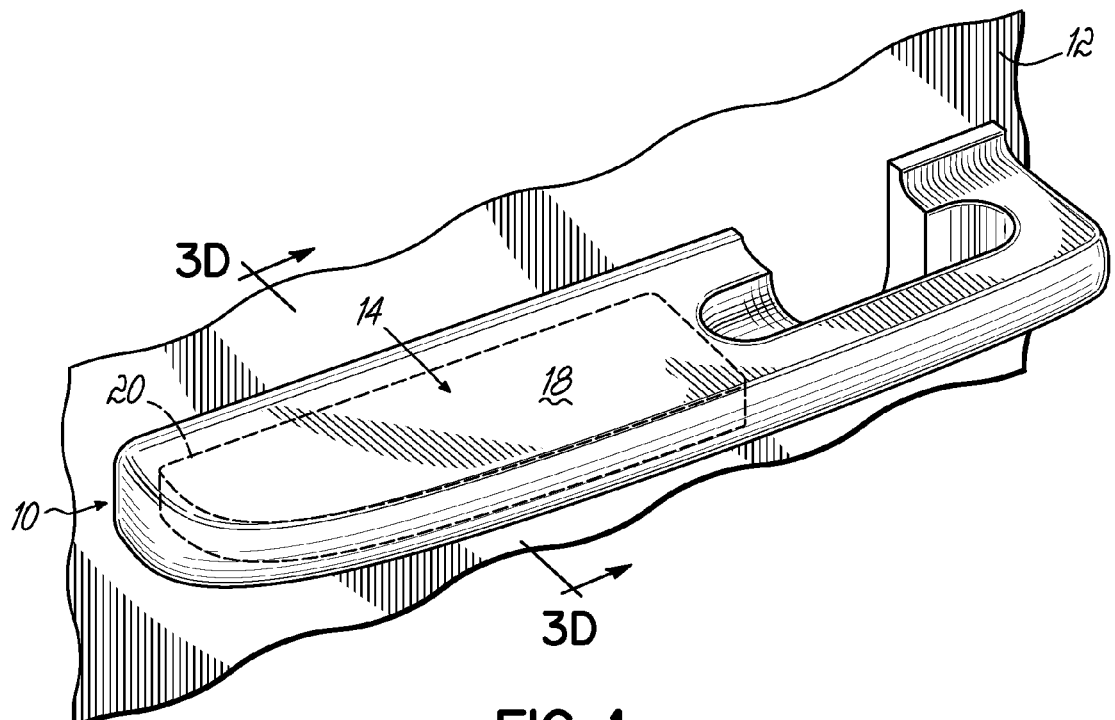
FIG. 1 is a perspective view of an exemplary automotive interior trim assembly according to the present invention, in the form of an armrest.

Referring to FIG. 1, there is shown an exemplary automotive interior trim assembly of the present invention, in the form of an armrest 10. The armrest 10 is attached to a vertical panel 12 within the interior of an automobile, such as a door panel. In the embodiment shown, the armrest 10 includes a first portion 14 providing a horizontal surface upon which a vehicle occupant may rest their arm. It is often desirable that first portion 14 of armrest 10 provide for a soft feel.

Figure 2:
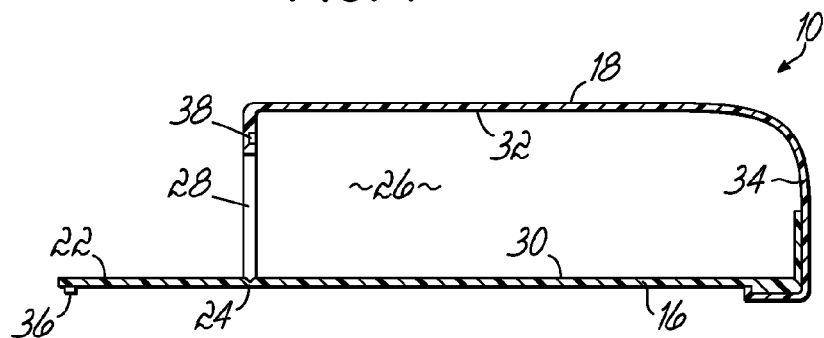
FIG. 2 is a cross-sectional view of the armrest of FIG. 1, without the foam pad.

With continued reference to FIG. 1, and referring further to FIGS. 2 and 3, the armrest 10 of the present invention includes a rigid substrate member 16, a flexibly skin layer 18 and a resilient foam pad 20. Substrate member 16 comprises a generally planar substrate that forms at least a part of the structural support of the armrest 10 and includes a closeout or moveable panel 22 integrally formed in substrate member 16. For example, moveable panel 22 may be integrally molded into substrate member 22. As shown in the figures, moveable panel 22 is attached to the substrate member 16 along living hinge 24. Living hinge 24 permits moveable panel 22 to pivotally move about hinge 24. Incorporating the closeout or moveable panel 22 into substrate member 16 advantageously reduces the number of components in the armrest 10 and therefore reduces the overall cost of manufacturing. The substrate member 16 is generally injection molded and formed from filled or unfilled polypropylene, thermoplastic olefin elastomers, acrylonitrile butadiene styrene, styrene maleic anhydride, polycarbonate/acrylonitrile butadiene styrene alloy, or other suitable materials for forming the rigid substrate member 16.

Flexible skin layer 18 is disposed over at least a portion of the substrate member 16 and integrally coupled thereto. For example, flexible skin 18 may be integrally molded to substrate member 16 by a known process such as over molding. As best shown in FIG. 2, flexible skin layer 18 and substrate member 16 are configured so as to define a cavity 26 having an opening 28 adjacent moveable panel 22. Cavity 26 may be generally rectangular having substrate member 16 bounding a bottom surface 30 and the skin layer 18 bounding top and side surfaces 32, 34 respectively. When the moveable panel 22 is in the open position the opening 28 of cavity 26 is accessible. When moveable panel 22 is pivoted about living hinge 24, opening 28 to cavity 26 may be closed or covered by moveable panel 22. Moveable panel 22 may further include a tab 36 and flexible skin layer 18 may further include a recess 38 such that when moveable panel 22 is moved to the closed position, tab 36 engages recess 38 to secure moveable panel 22 in the closed position. Flexible skin layer 18 is generally injection molded and may be formed from polyvinyl chloride, thermoplastic olefin elastomers or other suitable materials for forming a flexible skin over the substrate member 16.

As shown in FIGS. 3A–3D a resilient foam pad 20 is positioned in cavity 26 so as to be between the flexible skin layer 18 and the substrate member 16 and to provide a soft feel to armrest 10. Foam pad 20 is insertable into cavity 26 through opening 28. Foam pad 20 includes a top surface 42 and side surface 43 that abut the underside of top surface 32 and side surface 34 respectively of the flexible skin layer 18, and a bottom surface 44 that abuts the bottom wall 30 bounded by substrate member 16. When a load is applied to the top surface of the armrest 10, such as when an occupant rests his/her arm on the armrest, the flexible skin layer 18 and the resilient foam pad 20 deform thereby providing a soft feel to armrest 10. Foam pad 20 can be die-cut so as to conform to the geometric shape of cavity 26 and may be formed from vinyl nitrile resins as well as one of the polymeric resins, such as EPDM, polypropylene, polyethylene or other suitable materials.

The present invention utilizes a vacuum insertion tool 46 for inserting foam pad 20 within cavity 26. FIGS. 3A–3D sequentially illustrate the insertion of foam pad 20 within cavity 26 using the vacuum insertion tool 46. As shown in FIGS. 3A–3D and 4, the vacuum insertion tool 46 comprises a generally thin planar member 48 having a channel 50 formed therein. Advantageously, the planar member 48 is substantially coextensive with the foam pad 20 to be inserted into cavity 26, and the channel 50 is substantially coextensive with the planar member 48. One end 52 of the channel 50 is fluidly coupled to a vacuum pump 54 through, for example, a length of tubing 56. A top surface 58 of planar member 48 includes a plurality of apertures 60 therein and in fluid communication with channel 50. In this way, when vacuum pump 54 is energized, air is pulled through apertures 58, channel 50 and tubing 56 toward vacuum pump 54.

Figure 3A:
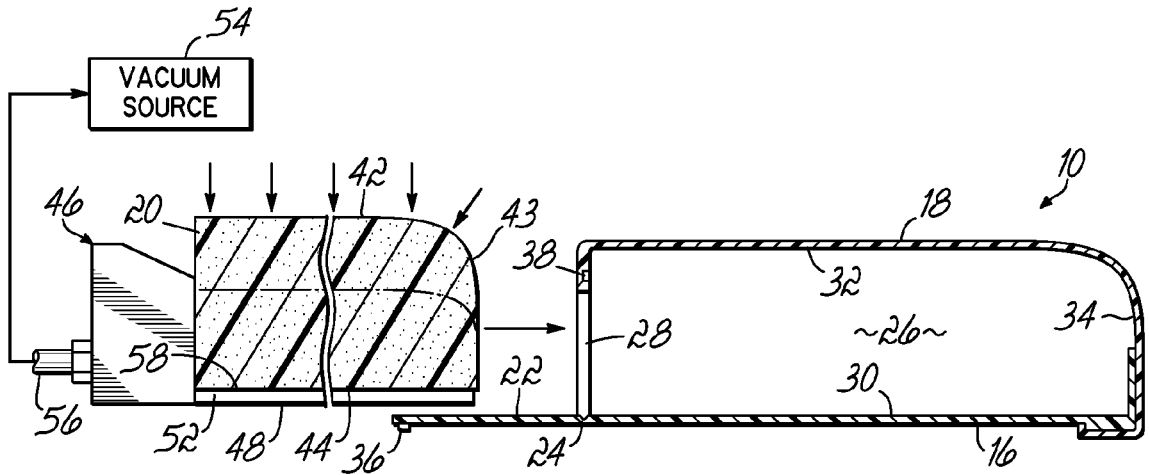
FIGS. 3A–3D are sequential cross-sectional views illustrating the insertion of a resilient foam pad into the armrest of FIG. 1 according to the present invention.

To insert foam pad 20 within cavity 26 using the vacuum insertion tool 46, the moveable panel 22 is moved to the open position so that the cavity opening 28 is accessible. The foam pad 20 is placed on the top surface 58 of planar member 48 so that the bottom surface 44 of the foam pad abuts top surface 58, as shown in FIG. 3A. The vacuum pump 54 is energized and air is pulled through apertures 60 along the top surface 58. The pressure differential between the top surface 42 and bottom surface 44 of foam pad 20 causes the foam pad 20 to be compressed in the downward direction thereby bringing top surface 42 closer to bottom surface 44, as shown in dash in FIG. 3A. Foam pad 20 may be sufficiently dense such that the vacuum pulled along bottom surface 44 causes the foam pad 20 to compress in the downward direction, as opposed to just pulling air in freely through top surface 42 and side surfaces 43 of foam pad 20 without any compression. Alternatively, foam pad 20 may be covered or coated along top surface 42 and side surfaces 43 by a gas impermeable material so that the vacuum causes the foam pad 20 to compress when pulled along bottom surface 44.

Figure 3B:
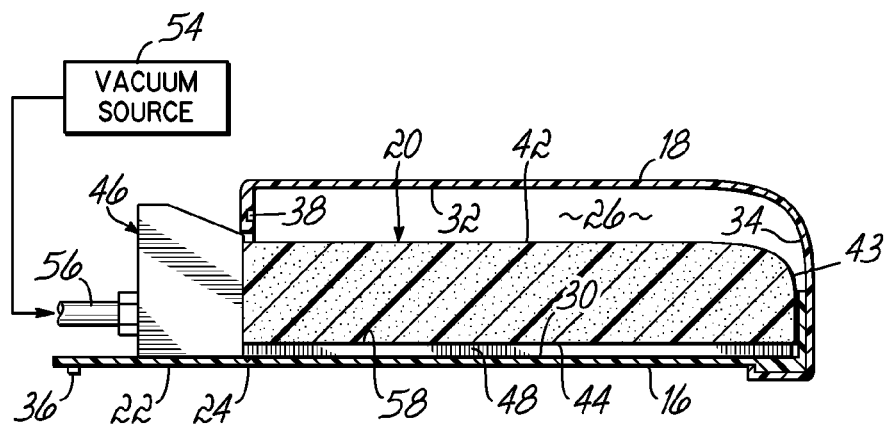
Figure 3C:
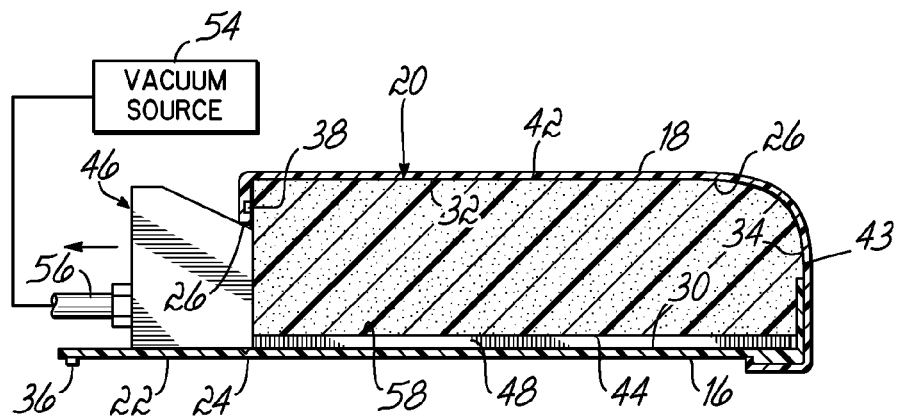
Figure 3D:
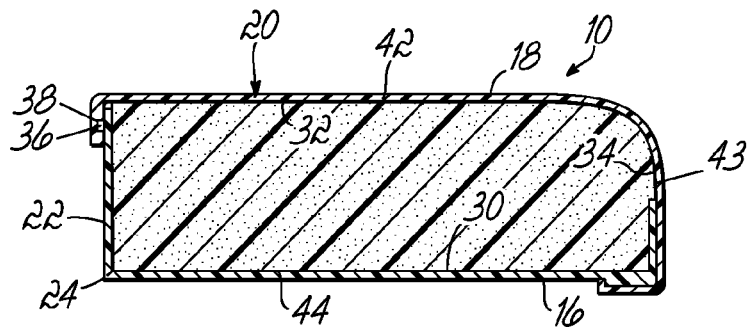
Figure 4:
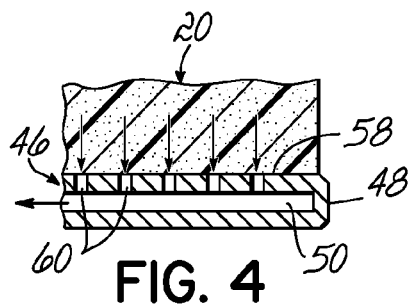
FIG. 4 is a partial enlarged cross-sectional view of the vacuum insertion tool used in the present invention.

The vacuum insertion tool 46 carrying the foam pad 20 in a compressed state is then inserted into cavity 26 through opening 28, as shown in FIG. 3B. When foam pad 20 is properly positioned inside cavity 26, the vacuum pump 54 is de-energized thereby releasing the vacuum along the bottom surface 44 of foam pad 20. Releasing the vacuum causes the foam pad 20 to expand thereby snugly filling cavity 26, as shown in FIG. 3C. The vacuum insertion tool 46 is then removed from the cavity by sliding planar member 48 along substrate member 16 at the bottom surface 30 of cavity 26. After removing the vacuum insertion tool 46 from within cavity 26, movable panel 22 is moved to the closed position so as to close off the opening 28 of cavity 26 and secured in the closed position by, for example, engaging tab 36 in movable panel 22 with recess 38 in the flexible skin 18, as shown in FIG. 3D. The method of inserting the foam pad 20 within cavity 26 using vacuum insertion tool 46 as described herein is advantageous in that the pad carrier of previous armrests is completely eliminated thus reducing the number of components and consequently reducing cost of manufacturing the trim assembly.

While the interior trim assembly has been shown and described herein as an armrest 10, it will be recognized that the interior trim assembly of the present invention may alternatively be formed to create a door trim panel, an instrument panel, a console or other interior components of an automobile.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly comprising:
  a substrate member forming at least part of a structural support of the trim assembly and including a moveable panel integrally formed in said substrate, said panel moveable between an open and closed position;
  a flexible skin overlying at least a portion of said substrate member and integrally coupled to said substrate, said flexible skin and said substrate member defining a cavity having an opening, said cavity opening being accessible when said moveable panel is in the open position, said moveable panel covering said cavity opening when in the closed position; and
  a resilient foam pad positioned within said cavity to provide a soft feel to said trim assembly, said foam pad insertable within said cavity when said panel is in the open position.

2. The trim assembly of claim 1 wherein said skin layer is integrally molded to said substrate member.

3. The trim assembly of claim 1 wherein said movable panel is integrally molded to said substrate member.

4. The trim assembly of claim 1 wherein said moveable panel includes a living hinge, said movable panel attached to said substrate member along said living hinge.

5. The trim assembly of claim 1 wherein said skin layer includes a recess, said movable panel includes a tab, said tab engaging said recess to secure said movable panel in the closed position.

6. The trim assembly of claim 1 configured as an armrest for an automobile.

7. An automotive interior panel having a trim assembly attached thereto, the trim assembly comprising:
  a substrate member forming at least part of a structural support of the trim assembly and mounted to the door panel, said substrate including a moveable panel integrally coupled to said substrate, said panel moveable between an open and closed position;
  a flexible skin overlying at least a portion of said substrate member and integrally coupled to said substrate, said flexible skin and said substrate member defining a cavity having an opening, said cavity opening being accessible when said moveable panel is in the open position, said moveable panel covering said cavity opening when in the closed position; and
  a resilient foam pad positioned within said cavity to provide a soft feel to said trim assembly, said foam pad insertable within said cavity when said panel is in the open position.

* * * * *